US009300710B2

(12) United States Patent
Winterrowd et al.

(10) Patent No.: US 9,300,710 B2
(45) Date of Patent: Mar. 29, 2016

(54) ADAPTIVE BANDWIDTH SWITCHING VIA SHORT-CIRCUITABLE DOWNLOAD

(71) Applicant: Qualcomm Innovation Center, Inc, San Diego, CA (US)

(72) Inventors: Lenhard W. Winterrowd, Mishawaka, IN (US); Apurupa Pattapu, San Diego, CA (US)

(73) Assignee: Qualcomm Innovation Center, Inc., San Diego, CA (US)

( * ) Notice: Subject to any disclaimer, the term of this patent is extended or adjusted under 35 U.S.C. 154(b) by 346 days.

(21) Appl. No.: 13/788,120

(22) Filed: Mar. 7, 2013

(65) Prior Publication Data

US 2014/0258463 A1 Sep. 11, 2014

(51) Int. Cl.
*H04L 29/06* (2006.01)

(52) U.S. Cl.
CPC ........ *H04L 65/4084* (2013.01); *H04L 65/4092* (2013.01); *H04L 65/80* (2013.01)

(58) Field of Classification Search
CPC .............. H04L 65/607; H04L 65/4076; H04L 65/4092; H04L 47/12; H04L 65/602; H04L 29/06027; H04L 65/4069; H04L 65/80; H04L 65/4084; H04L 12/14; H04L 41/0893; H04L 45/74; H04L 47/2483; H04L 65/1006; H04L 65/103; H04L 67/04; H04L 41/5035; H04L 43/0852; H04L 47/2416; H04L 47/2458; H04L 67/02; H04L 63/1425; H04L 63/0245; H04L 63/0227; H04L 63/1408; H04L 63/164; H04L 63/166; H04L 69/22; H04L 69/166; H04L 47/11; H04L 12/00; G06F 17/30899; G06F 13/1663; G06F 15/167; Y10S 707/912; Y10S 707/913; Y10S 707/99944
See application file for complete search history.

(56) References Cited

U.S. PATENT DOCUMENTS

| | | | | |
|---|---|---|---|---|
| 6,477,529 | B1 * | 11/2002 | Mousseau | G06F 17/30905 |
| 8,630,168 | B2 * | 1/2014 | Stephens | H04W 74/02 370/230 |
| 2012/0140633 | A1 * | 6/2012 | Stanwood et al. | 370/235 |
| 2013/0094364 | A1 * | 4/2013 | Bjorkengren | H04W 52/0232 370/236 |
| 2013/0235152 | A1 * | 9/2013 | Hannuksela | H04N 19/00769 348/43 |
| 2013/0290493 | A1 * | 10/2013 | Oyman | H04B 7/0486 709/219 |
| 2014/0143440 | A1 * | 5/2014 | Ramamurthy | H04N 21/23439 709/231 |
| 2014/0156863 | A1 * | 6/2014 | Gao | H04L 65/4084 709/231 |
| 2014/0215085 | A1 * | 7/2014 | Li | H04L 65/4084 709/231 |
| 2014/0219346 | A1 * | 8/2014 | Ugur | H04N 19/00575 375/240.12 |

OTHER PUBLICATIONS

Communications Magazine, IEEE vol. 50 Issue 4, Apr. 2012, pp. 20-27, "Quality of Experience for HTTP Adaptive Streaming Services" by Ozgur Oyman et al.*

* cited by examiner

Primary Examiner — Kevin Bates
Assistant Examiner — Ranjan Pant
(74) Attorney, Agent, or Firm — Neugeboren O'Dowd PC

(57) ABSTRACT

Stalling of segment downloads during adaptive bandwidth switching where bandwidth drops in the midst of download of a segment is overcome by downloading segments in multiple subsegments via multiple download operations. Additionally, bandwidth monitoring can be performed in between each subsegment download, and if bandwidth has fallen substantially, and the segment download is not near completion, then the already-downloaded subsegments can be discarded, and the segment download can be restarted from a lower-quality variant.

20 Claims, 7 Drawing Sheets

ADAPTIVE BANDWIDTH SWITCHING VIA SHORT-CIRCUITABLE DOWNLOAD

BACKGROUND

1. Field

The present disclosure relates generally to streaming media, and more specifically to switching streaming media quality in response to bandwidth changes.

2. Background

Adaptive bandwidth switching (or adaptive bitrate streaming) detects a user's bandwidth and CPU capacity in real time and adjusts the quality of a video stream or other media stream accordingly. The original media file is encoded at different bitrates and stored as multiple playlists where each playlist references a different quality encoding of the original media file split into "segments." As the stream is played, the client can select from these alternate streams allowing the stream to adapt to the available network and processor resources. APPLE's HTTP Live Streaming (HLS) protocol is one example of an adaptive bandwidth switching protocol and is implemented in QUICK TIME and the ANDROID OS. MPEG-DASH, ADOBE DYNAMIC STREAMING for FLASH, and MICROSOFT's SMOOTH STREAMING are other examples of adaptive bandwidth switching protocols.

Traditional protocols account for changes in network bandwidth by monitoring the network bandwidth in between downloading segments and requesting a lower-quality stream if the available bandwidth substantially decreases (e.g., where a mobile device loses a WIFI connection and switches to a congested 3G network). One problem with such methods is that the bandwidth sometimes decreases during a segment download, where segments often correspond to 10 seconds of media and hence many megabytes of data must be downloaded before stream switching can occur. When this happens, a high quality segment may be stuck downloading on a low-bandwidth connection thus leading to stalling of media playback.

FIG. 1 illustrates a variant playlist and the files that each variant in the variant playlist refers to. The variant playlist 100 includes a plurality of playlists (or variants) 102, 104, 106, which each reference a first file 108, a second file 110, and a third file 112, respectively. These references are made via respective links 114, 116, 118 that indicate a location in memory where the first, second, and third files 108, 110, 112 can be accessed. The links 114, 116, 118 may also indicate what device or virtual device the first, second, and third files 108, 110, 112 are stored on. Each of the files 108, 110, 112 is an encoding of an original media file at different quality levels (e.g., different bitrates). For instance, the first file 108 can be encoded at a lowest quality (e.g., 1 mb/s), the third file 112 can be encoded at a highest quality (e.g., 6 mb/s), and the second file 110 can be encoded at a middle quality (e.g., 3 mb/s) in between that of the first and third files 108, 112. Each of the three files 108, 110, 112 is separated into six segments corresponding to equal periods or equal file sizes within the original media file.

FIG. 2 illustrates a method of adaptive bandwidth switching as known in the art. The method 200 begins by determining a bandwidth available for downloading a segment of a streaming media file in a determine available bandwidth operation 204. Given different qualities of the streaming media file, such as the first, second, and third files 106, 108, 110 in FIG. 1, a selection operation 206 selects a stream or variant that corresponds to the bandwidth identified in the determine available bandwidth operation 204. A download segment operation 208 proceeds to download sequential segments of the selected variant, for instance, a lowest quality file (e.g., 106). After the first segment has been received, a streaming complete determination 210 determines if the streaming media file has completed streaming. If so, the method 200 ends.

If not, the method 200 returns to the determine available bandwidth operation 204 and determines the available bandwidth. The selection operation 206 again selects a stream that corresponds to the bandwidth; if the bandwidth has not significantly changed, then the selection operation 206 selects the same stream as before, but if the bandwidth has significantly changed, then the selection operation 206 selects a different stream. This process continues until the streaming complete determination 210 determines that the streaming is complete.

Trouble arises when the bandwidth decreases substantially during the download segment operation 208 causing a higher quality segment to attempt network traversal when there are insufficient network resources. Current methods are unable to interrupt the download segment operation 208, so the download of the segment continues even if this process takes many seconds, minutes, or is indefinite. Although the segment may eventually complete downloading, the user experiences a choppy or even stalled media stream.

There is therefore a need for systems and methods able to perform adaptive bandwidth switching without the stalling caused by bandwidth changes that occur during the download segment operation 208.

SUMMARY

Embodiments disclosed herein address the above stated needs by providing in one aspect, a system for adaptive bandwidth switching including a network interface, a client buffer, and a bandwidth monitoring module. The network interface can be configured to download segments of an original media file from a server via multiple download operations, each download operation of a subsegment of a segment encoded at a first quality. The client buffer can store the subsegments. The bandwidth monitoring module can be configured to determine a bandwidth of a network connection between the network interface and the server. The bandwidth monitoring module can further be configured to decide whether a current one of the segments should be downloaded at a second quality different from the first quality, and if so: discard downloaded subsegments of the current one of the segments from the client buffer; and download a current one of the segments encoded at a second quality.

Another aspect of the disclosure describes a method for streaming an original media file using adaptive bandwidth switching. The method can include downloading, via multiple read operations, into a client buffer, subsegments of a segment of the original media file, the segment being one of a plurality of segments in a first variant, the first variant referencing a first quality encoding of the original media file. The method further can include determining that a bandwidth of the network has decreased, where the determining occurs at or after a start of each read operation. Subsequently, the method can further include predicting that switching to a second variant referencing a second quality encoding of the original media file will enable a faster download of the segment. The method can yet further include discarding from the client buffer, subsegments of the segment that have already been downloaded, and selecting a second variant. The second variant can reference a second quality encoding of the original media file, the second quality being less than the first quality. The method can also include downloading, via multiple read operations, into the client buffer, subsegments of the segment of the original media file, the segment being one of a plurality of segments in a second variant.

Yet another aspect of the disclosure is a non-transitory, tangible computer readable storage medium, encoded with processor readable instructions to perform a method for adaptive bandwidth switching. The method can include downloading, via multiple read operations, into a client buffer, subsegments of a segment of the original media file, the segment being one of a plurality of segments in a first variant, the first variant referencing a first quality encoding of the original media file. The method further can include determining that a bandwidth of the network has decreased, where the determining occurs at or after a start of each read operation. Subsequently, the method can further include predicting that switching to a second variant referencing a second quality encoding of the original media file will enable a faster download of the segment. The method can yet further include discarding from the client buffer, subsegments of the segment that have already been downloaded, and selecting a second variant. The second variant can reference a second quality encoding of the original media file, the second quality being less than the first quality. The method can also include downloading, via multiple read operations, into the client buffer, subsegments of the segment of the original media file, the segment being one of a plurality of segments in a second variant.

Another aspect of the disclosure is a system for adaptive bandwidth switching. The system can include a means for downloading, via multiple read operations, into a client buffer, subsegments of a segment of the original media file, the segment being one of a plurality of segments in a first variant, the first variant referencing a first quality encoding of the original media file. The system can further include a means for determining that a bandwidth of the network has decreased, where the determining occurs at or after a start of each read operation. The system can further include a means for predicting that switching to a second variant referencing a second quality encoding of the original media file will enable a faster download of the segment. The system can yet further include a means for discarding from the client buffer, subsegments of the segment that have already been downloaded. The system can also include a means for selecting a second variant, the second variant referencing a second quality encoding of the original media file, the second quality being less than the first quality. Finally, the system can include a means for downloading, via multiple read operations, into the client buffer, subsegments of the segment of the original media file, the segment being one of a plurality of segments in a second variant.

BRIEF DESCRIPTION OF THE DRAWINGS

FIG. 1 illustrates a set of playlists and the files that they refer to;

DETAILED DESCRIPTION

The word "exemplary" is used herein to mean "serving as an example, instance, or illustration." Any embodiment described herein as "exemplary" is not necessarily to be construed as preferred or advantageous over other embodiments.

This disclosure overcomes the challenges of the prior art by restarting the download of segments that are stuck downloading on network resources that are unsuited for the quality of the segment. While streaming media files are still downloaded in segments, those segments are broken into subsegments, for the purposes of read operations, and are read from the client buffer via multiple read operations. In this way bandwidth monitoring can be performed in between each read cycle, and a segment download can be restarted mid-segment if needed.

At the same time, restarting a segment download is not always the fastest way to complete download of a segment when the bandwidth has dropped. In some cases, download of a segment may have progressed to such an extent that completing the segment download, even slowly, is still faster than restarting the segment download with a lower quality version of the segment. Because of this, where bandwidth has changed, the systems, methods, and apparatus may further determine whether switching to a lower-quality version of a segment is faster than merely continuing with the current quality of the segment.

For the purposes of this disclosure a "variant" or playlist references addresses of a sequence of segments that when streamed in sequence make up a media file encoded at a particular bitrate. When multiple variants of the same media file are created, adaptive bandwidth switching can be used to switch the quality of media being streamed in real time to adapt to changes in bandwidth.

Figure 1:
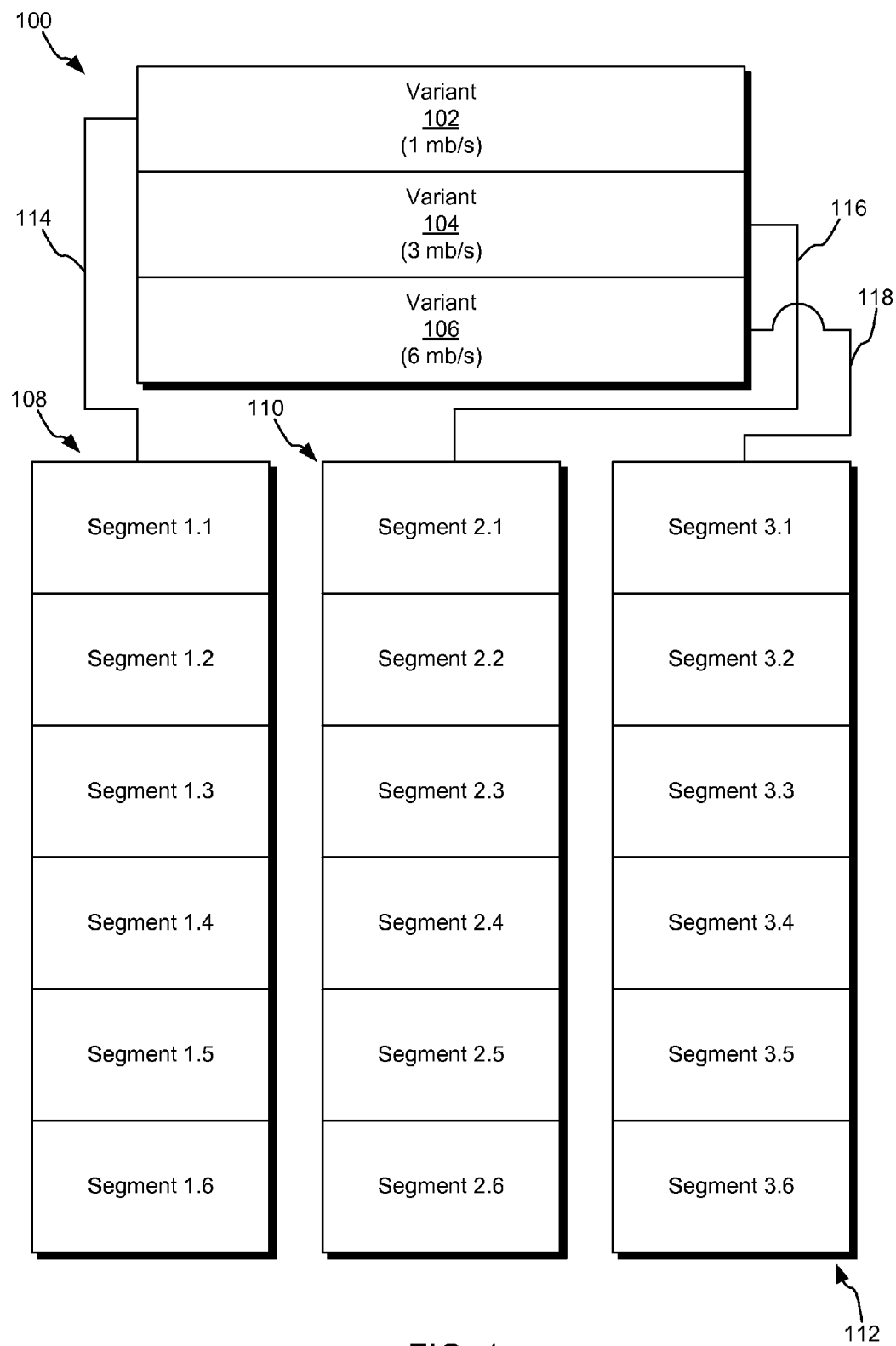
Figure 2:
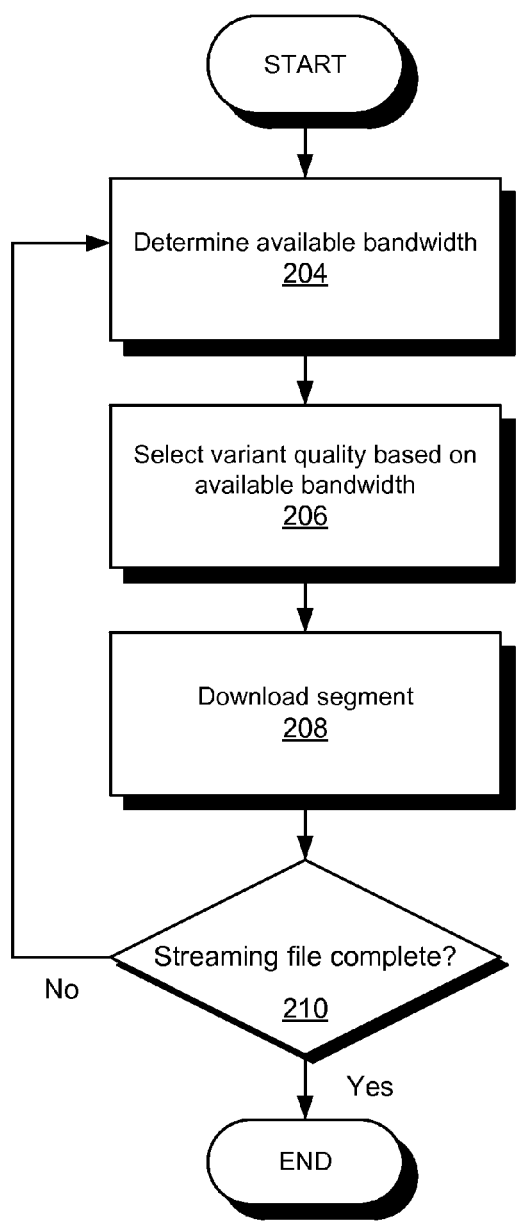
FIG. 2 illustrates a method of adaptive bandwidth switching as known in the art.
Figure 3:
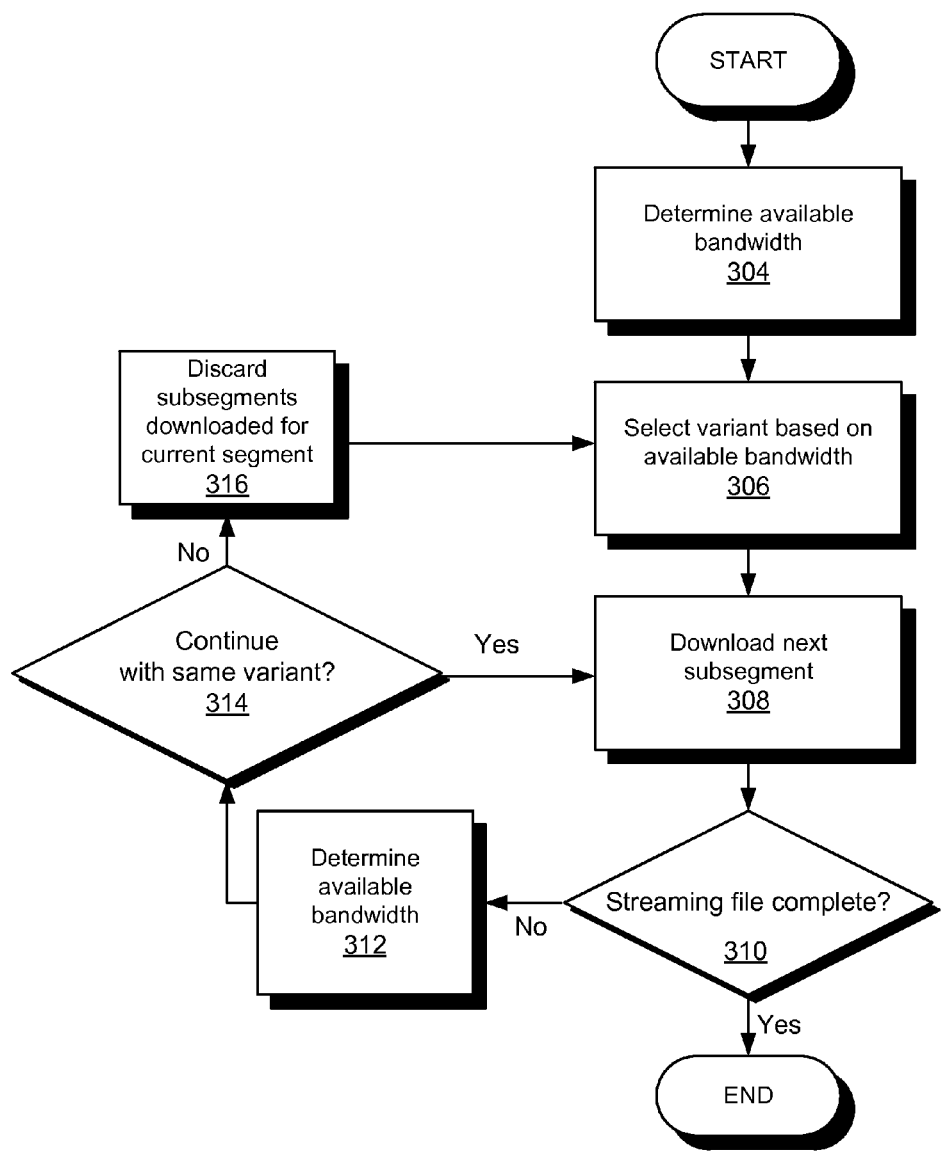
FIG. 3 illustrates a method for adaptive bandwidth switching according to one embodiment of this disclosure.
Figure 4:
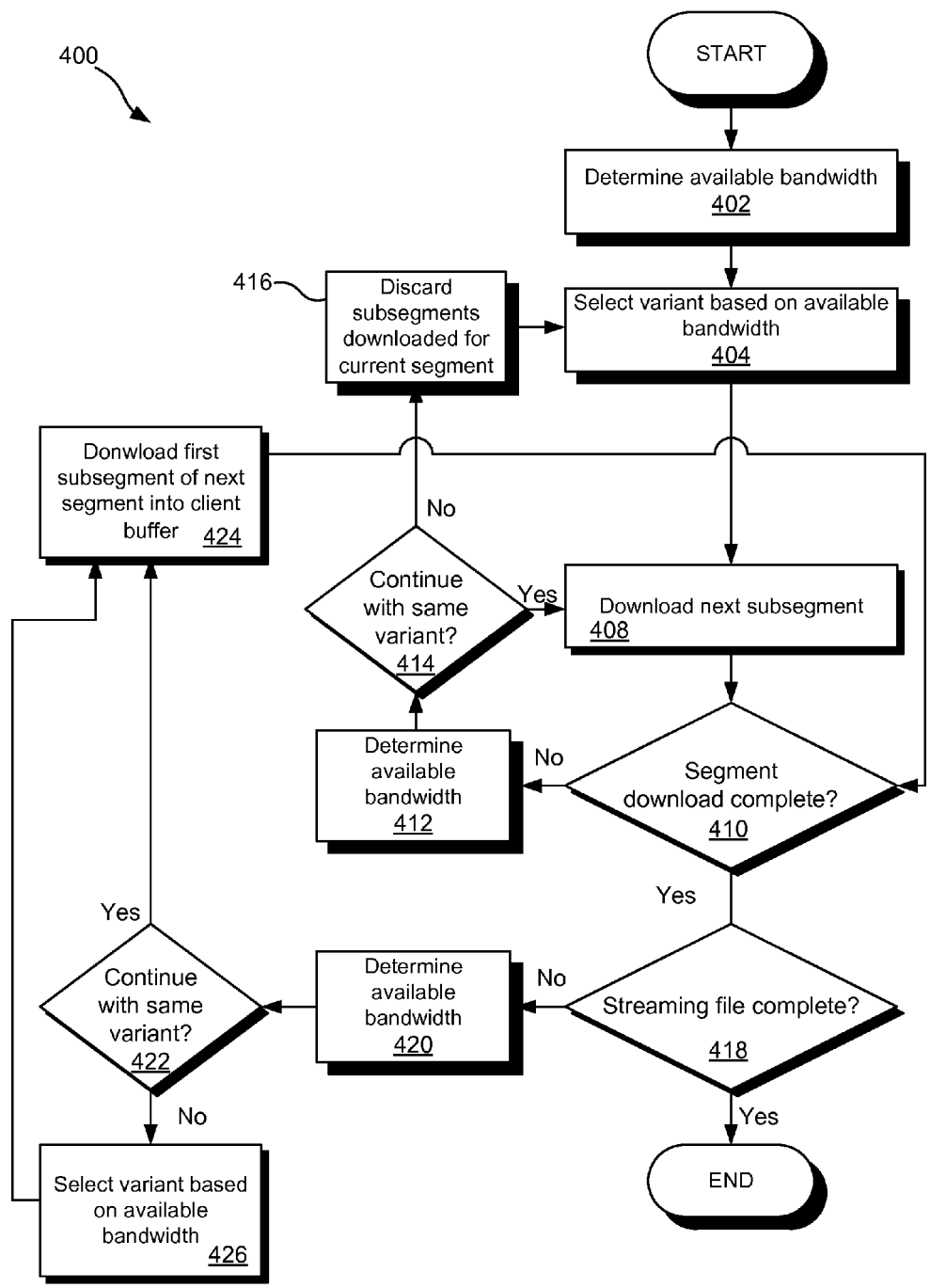
FIG. 4 illustrates another method for adaptive bandwidth switching.

FIG. 3 illustrates a method for adaptive bandwidth switching according to one embodiment of this disclosure. The method 300 begins by determining a bandwidth available for downloading a segment of a streaming media file or original media file in a first determine available bandwidth operation 304. Given different qualities of the streaming media file (e.g., first, second, and third streaming media files 108, 110, 112 in FIG. 1), as indexed by different variants (e.g., first, second, and third variants 102, 104, 106), a select variant operation 306 selects a variant that is appropriate for download via the bandwidth identified in the determine available bandwidth operation 304. An appropriate variant is one having the highest quality that can be downloaded given the bandwidth without degrading the user experience. Selection of a variant means that the segments of a streaming media file encoded at a particular quality and indexed by that variant, will be downloaded. A download next subsegment operation 308 then downloads a subsegment of a segment corresponding to the selected variant (in other words a version of the media file encoded in the quality selected in the select variant operation 306). After downloading the subsegment, a streaming file complete determination 310 determines if the streaming media file has completed streaming. In some embodiments, the streaming file complete determination 310 can alternatively decide if a segment has completed downloading, and if so, then ask whether the whole media file has also finished downloading. If so, the method 300 ends. This is illustrated in FIG. 4.

If the streaming media file has not completed downloading, then the method 300 turns to a determine available bandwidth operation 312 which again determines the available bandwidth. A continue with same variant decision 314 determines if the bandwidth has changed, if at all, by a sufficient rate to justify switching to different variant. If the bandwidth has not changed, then the continue with same variant decision 314 directs the method 300 to continue downloading the current segment by fetching further subsegments that make up the segment from the same variant via the download next subsegment operation 308 and looping through the streaming file complete determination 310, the determine available bandwidth operation 312, and back to the continue with same variant decision 314.

If the bandwidth has changed, then the continue with same variant decision 314 may consider switching to a more appropriate stream quality or variant. However, switching may not always save time, even where bandwidth has dropped. For instance, where the current segment was 95% complete, it may be faster to complete the segment download, even at a slow bandwidth, than to start the segment over, with a lower quality, and hence faster, stream. For instance, where the remaining 5% of the file is smaller in size than the segment at a lower quality, continuing to download the segment via the current quality will result in faster completion than restarting. If the remaining 5% still entails substantial download (e.g., 100 mb), then the entire segment at a lower quality may be a smaller file size (e.g., 10 mb). Where the remaining segment size is greater than a size of the entire segment at a lower quality or lower variant, the continue with same variant decision 314 will decide to move to the discard subsegments operation 316 and restart the segment download at a lower quality.

Figure 5:
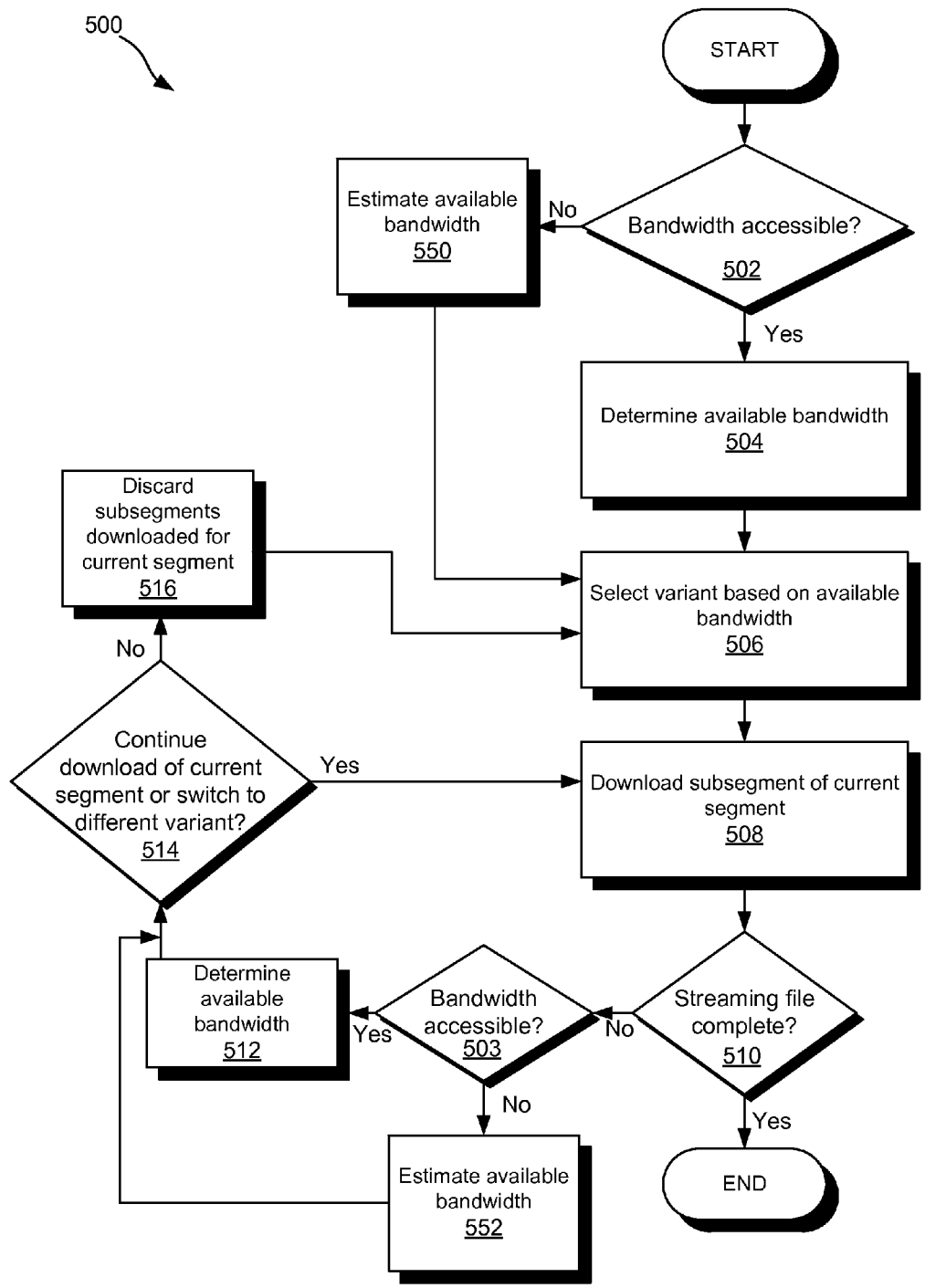
FIG. 5 illustrates yet another method for adaptive bandwidth switching where the bandwidth may not be accessible.

Such a continue with same variant decision 314 may use knowledge of the bandwidth and the file size of the remaining segment as well as a file size of a lower-quality variant. Often, file size and bandwidth can be determined without challenge. However, where file size and/or bandwidth are not easily accessed, there are ways to estimate both, and one method showing such an estimate is illustrated in FIG. 5.

If the continue with same variant decision 314 decides to change variants, then the method 300 can discard subsegments of the current segment that have been downloaded to the client buffer in discard subsegments operation 316. The method 300 can then return to the select variant operation 306 where a new variant is selected. The method 300 then carries on as described above until all segments making up the original media file have downloaded.

Bandwidth determination is straightforward in many circumstances. For instance, a module may analyze a header of a data packet to determine bandwidth or may monitor an indicator of a network interface that indicates the bandwidth of the network connection. However, in some cases, the determine available bandwidth operation 304 may be unsuccessful. In cases where bandwidth information is not available, the method illustrated in FIG. 5 can be used to estimate bandwidth.

"Nuhttp" datasource is an example of a software module that is used to determine bandwidth in the determine available bandwidth operation 304. The Nuhttp module talks to a socket that the subsegments are downloaded to. In one instance, an average bandwidth stretching back some period in time can be used to determine a bandwidth. In another instance, bandwidth can be determined via a weighted average of all past bandwidth measurements or records along with a most-recent bandwidth. In one instance, a most-recent bandwidth can be more heavily weighted than all other measurements or records. Bandwidth can be extracted from values or data in a segment or subsegment (e.g., in a header) that indicate a bandwidth of the network connection. Bandwidth can also be measured at the network interface of the client device.

Adaptive bandwidth switching typically encodes two or more copies or the original media file in different qualities, herein referred to as variants. The select variant operation 306 can use a variety of algorithms to determine what variant to use based on the available bandwidth as determined in the determine available bandwidth operation 304. In one embodiment, variants can each be associated with ranges of available bandwidths, such that the select variant operation 306 selects a variant having a range of bandwidths that encompasses the available bandwidth. In one example, the different variants may include metadata indicating a range of available bandwidths that each variant is best-suited for. Alternatively, an index of the variants can include ranges of available bandwidths that are each associated with a different variant. The select variant operation 306 can read this index and select the variant associated with a range of available bandwidths that encompasses the available bandwidth identified in the determine available bandwidth operation 304.

It should be noted that, from the standpoint of downloading, the prior art downloads a media file in segments, while the present disclosure downloads media files in subsegments of the segments. Thus, where the prior art makes a single download (or read call) for a segment, this disclosure makes a plurality of downloads (or read calls) in order to download the segment. By downloading each segment in multiple subsegments, the method 300 is able to monitor bandwidth and stop a download even while a segment is downloading. This enables restart of a segment download where the prior art would get 'stuck' downloading a single segment.

The determine available bandwidth operation 312 has similar function to the determine available bandwidth operation 304. In some embodiments, the determine available bandwidth operation 312 can be performed after the streaming file complete decision 310 while in other embodiments, it can be performed between the download next subsegment operation 308 and the streaming file complete decision 310.

The point of the continue with same variant decision 314 is that if the bandwidth has dropped such that streaming at the current quality (e.g., via the current variant) is too slow, then switching to a lower quality stream should be considered. The continue with same variant decision 314 can focus solely on changes in bandwidth when determining whether to continue with the same variant. However, in some embodiments, the continue with same variant decision 314 may look at changes in bandwidth, and if a substantial change has occurred, then the continue with same variant decision 314 may look at the remaining amount of data to be downloaded in a given segment. With this information, the continue with same variant decision 314 can determine how long it will take to complete downloading the segment at the given bandwidth. This time can then be compared to an estimated time that will be required to download the segment if the fetched subsegments for the segment are discarded and the segment is restarted with a variant better suited to the current bandwidth. Such decisions may consider segment size and subsegment size as well as an identifier of the last subsegment that was downloaded and the current bandwidth in order to estimate how long completion of the segment would take given the new bandwidth. If either the segment size or the bandwidth are unknown, then the method 300 can estimate the segment size and/or the bandwidth.

This continue with same variant decision 314 may also consider additional factors such as any indications that the bandwidth change is just temporary. In such an instance, the continue with same variant decision 314 may decide to continue with the same variant where it otherwise would decide to move to the discard subsegments operation 316.

Discarding subsegments can include clearing a buffer or at least removing the subsegments from a buffer or other short-term memory structure. An index file may be downloaded along with the first segment of a media file, or with the first segment of a given variant. The index can provide the client with URLs for remaining segments of the media file in the same variant.

FIG. 4 illustrates another method for adaptive bandwidth switching. The method 400 begins by determining a bandwidth available for downloading a segment of a streaming media file in a first determine available bandwidth operation 402. Given different qualities of the streaming media file (or different variants or playlists in a variant playlist), such as the first, second, and third files 108, 110, 112 in FIG. 1, a select variant operation 404 selects a variant that is appropriate for download via the bandwidth identified in the first determine available bandwidth operation 402 (e.g., a variant having the highest quality that can still be downloaded via the given bandwidth and not degrade user experience). Downloading takes place via multiple download operations each embodied in the download next subsegment operation 408, where each segment is downloaded in subsegments, and each segment has a quality corresponding to the variant selected in select variant operation 404. The subsegments are downloaded into a buffer of a client device or module. A segment download complete decision 410 then determines if all subsegments of the segment have been downloaded.

If not, then the method 400 loops so as to download a next subsegment of the segment. In particular, a determine available bandwidth operation 412, similar or identical to the first determine available bandwidth operation 402, determines the available bandwidth. Thus, bandwidth gets checked after each subsegment is downloaded, whereas the art typically only checks bandwidth after each segment has completed downloading. A continue with same variant decision 414 determines if the bandwidth has changed, if at all, by a sufficient rate to justify switching to a segment from a different variant. If the bandwidth has not changed, then the continue with same variant decision 414 directs the method 400 to continue downloading the current segment by downloading subsegments from the same variant via downloading another subsegment from the download next subsegment operation 408. The method 400 then continues from download next subsegment operation 408. The continue with same variant decision 414 occurs at or after a start of the download next subsegment operation 408.

If the bandwidth has changed, then the continue with same variant decision 414 may carry out an algorithm that weighs the costs and benefits of completing download of the segment given an inappropriate variant for the bandwidth versus discarding the downloaded subsegments and starting download of the segment over again, but with an appropriate variant for the bandwidth. In other words, the continue with same variant decision 414 predicts if switching to a second variant referencing a second quality encoding of the original media file will enable a faster download of the segment.

If the continue with same variant decision 414 decides to change variants, then the method 400 can discard subsegments of the current segment that have already been downloaded and stored in the client buffer. This can occur in discard subsegments operation 416. The method 400 can then return to the select variant operation 404 where a new variant is selected. The method 400 then carries on as described above.

Returning to the segment download complete decision 410, if the segment has been downloaded, then the method 400 determines if the entire streaming media file has completed downloading in decision 418 or if a next segment is to be downloaded. If the streaming media file has completed downloading, then the method 400 can end. Otherwise, the bandwidth is again checked in a second determine available bandwidth operation 420.

The method 400 then determines if the first subsegment from the next segment should be downloaded from the same variant in a continue with same variant decision 422. The continue with same variant decision 422 uses a similar algorithm to that described relative to the continue with same variant decision 414. Thus, if the continue with same variant decision 422 decides to use the same variant, then a download operation 424 can download subsegments of a next segment into the client buffer followed by a downloading of the subsegments from the client buffer via download next subsegment operation 408. The method 400 then continues as described above until the streaming media file has completed streaming to the client device.

If the continue with same variant decision 422 decides to continue with a different variant, then a second select variant operation 426 selects a variant based on the available bandwidth as determined by the second determine available bandwidth operation 420 and then begins downloading subsegments of the next segment into the client buffer via download operation 424. The method 400 then continues as described above.

Thus, one can see how the method 400 enables a stream to be checked for bandwidth degradation within each segment whereas the art typically only checks at the end of a segment. But, what is more, the method 400 enables a client device to stop a segment download in the midst of downloading a segment and restart the segment download using a variant that is better matched for bandwidth if there is a loss or change of bandwidth. And further, the method 400 does not always change variants just because a change or loss in bandwidth is detected—in some cases, the method 400 determines that user experience will be better off by allowing the segment to finish downloading even where bandwidth has dropped.

The client buffer can have a limited size, and in some cases, the buffer is smaller than a size of a segment. As such, the client buffer may partially or wholly clear after a subsegment or segment is downloaded in the download next subsegment operation 408. The client buffer can exist in a TCP network layer in one embodiment.

The download operation may be implemented via a "Read" function of the FetchFile portion of HTTP code. Typically a download or read function cannot be stopped once called, and therefore, once a segment begins downloading, the process cannot be stopped. However, here, segments are downloaded in subsegments. In some cases, a segment can be broken into 16 subsegments for the purposes of downloading, while in others the number of subsegments may be related to bandwidth (e.g., more subsegments in a segment for low bandwidth and less subsegments in a segment for higher bandwidth).

FIG. 5 illustrates yet another method for adaptive bandwidth switching where the bandwidth may not be accessible. The main difference between the methods 300 and 400 and the method 500 is that the method 500 accounts for instances where bandwidth is not accessible, and in these cases estimates the bandwidth. In particular, like the methods 300 and 400, the method 500 first attempts to check the available bandwidth. Where a first bandwidth accessible decision 502 determines that bandwidth is accessible, the method 500 can determine bandwidth via determine bandwidth operation 504 and the method 500 carries on in a similar fashion to the method 300. However, if bandwidth is not accessible, then the first bandwidth accessible decision 502 pushes the method 500 to a first estimate bandwidth operation 550, a process that will be described in more detail below. The method 500 then selects a variant based on the available bandwidth determined in determine bandwidth operation 504 or estimated in the first estimate bandwidth operation 550 via select variant operation 506. Subsegments are then downloaded in download operation 508 for a segment of the selected variant. A streaming file complete decision 510 determines if streaming of the media file is complete (e.g., all segments in a variant playlist have downloaded). If so, then the method 500 ends, but if not, the method 500 again tries to check available bandwidth. If a second bandwidth accessible decision 503 determines that bandwidth is accessible, then the method 500 can determine the available bandwidth via determine operation 512. However, if the first bandwidth accessible decision 502 returns a negative finding, then a second estimate bandwidth operation 552 estimates an available bandwidth just as the first estimate bandwidth operation 550 did earlier. In some cases, the first and second estimate operations 552 and 550 can be the same operation.

Whether the available bandwidth is estimated or determined, a continue or switch variant decision 514 determines if the same variant should continue to be used for the next subsegment of the current segment. If the continue or switch variant decision 514 deems a new variant to be unnecessary, then the method 500 downloads a next subsegment as before via download operation 508. If a new variant is required, then the method 500 discards subsegments of the current segment that have been downloaded in a discard subsegments operation 516 and then selects a variant based on the available bandwidth as determined by determine operation 512 or estimated by the second estimate bandwidth operation 552. The method 500 then continues as described before.

The major difference between the method 500 and the method 300 is the ability to handle situations where bandwidth is not available and instead is estimated. The first and second estimation operations 550 and 552 have similar functionality. In some embodiments, the first and second estimation operations 550 and 552 can average a set of most recent bandwidth measurements or determinations. In another embodiment, the first and second estimation operations 550 and 552 can perform a weighted average of the set of most recent bandwidth measurements or determinations. In one embodiment, a most recent bandwidth measurement or determination can be more heavily weighted than all other bandwidth measurements or determinations. In one embodiment, the set of most recent bandwidth measurements or determinations includes around 100 measurements or determinations.

Bandwidth can often be extracted from a header of a segment or determined via analysis of some aspect of the media stream or network connection. However, in some cases, as determined by the first bandwidth accessible decision 502, bandwidth may not be accessible. The second bandwidth accessible decision 503 operates similarly.

Figure 6:
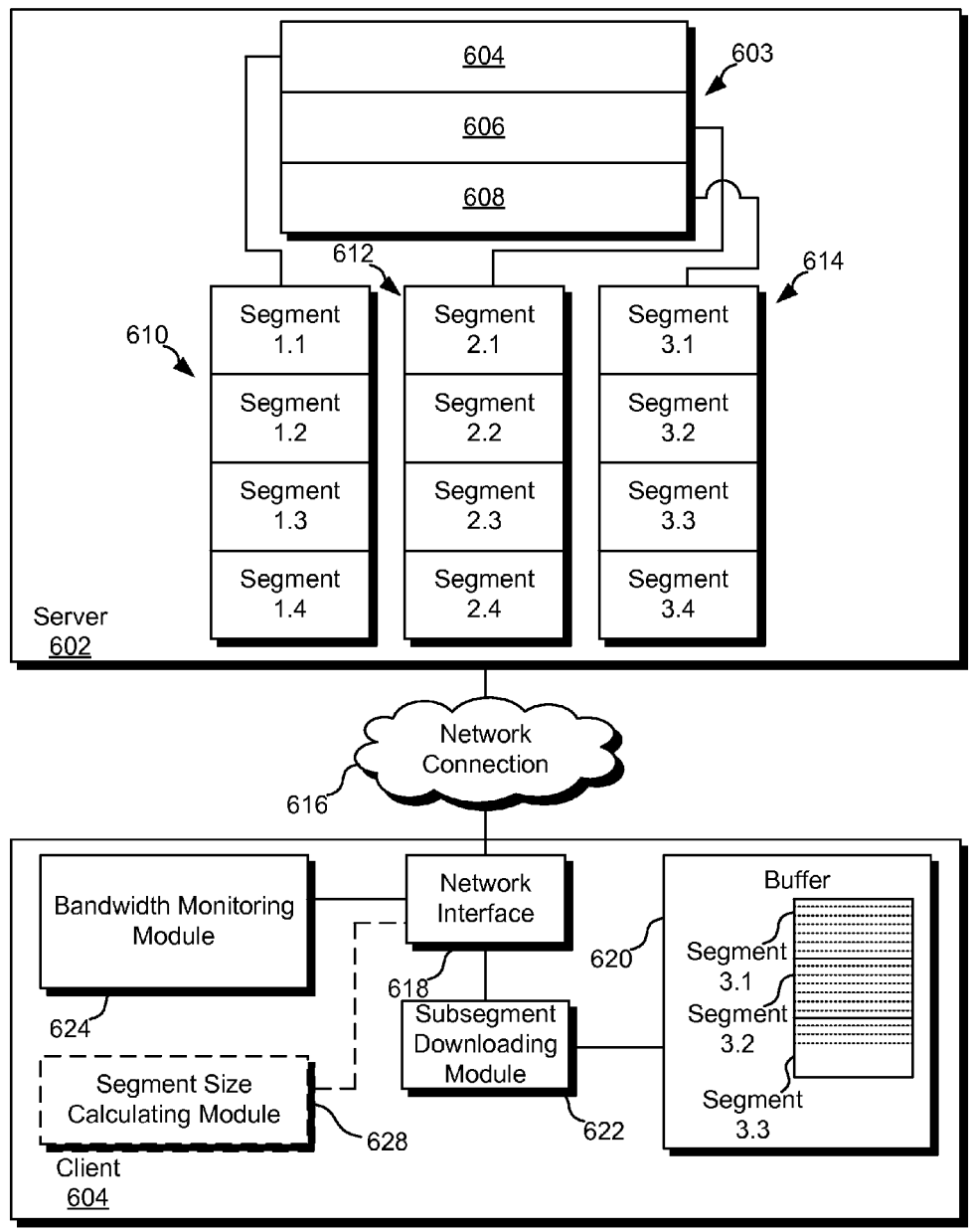
FIG. 6 illustrates a client and server for carrying out adaptive bandwidth switching according to one embodiment of this disclosure.

FIG. 6 illustrates a client and server for carrying out adaptive bandwidth switching according to one embodiment of this disclosure. The server 602 includes a variant playlist 603 and can be remote from the client 604. The variant playlist 603 can include any number of variants, although here three are illustrated: a first variant 604, a second variant 606, and a third variant 608. The first variant 604 can reference a first file 610 encoded at a first quality (e.g., 1 mb/s), and the first file 610 can be split into multiple segments (e.g., four segments). The second variant 606 can reference a second file 612 encoded at a second quality, higher than the first quality, and the second file 612 can be split into a number of segments (e.g., four segments). The third variant 608 can reference a third file 614 encoded at a third quality, higher than the second quality, and the third file 614 can be split into multiple segments (e.g., four segments).

The client 604 downloads the segments from the server 602 via network connection 616. The client 604 further downloads the segments via multiple download operations, where each download operation downloads a subsegment of a segment. In particular, subsegments are downloaded through a network interface 618. A subsegment downloading module 622 can download the subsegments through the network interface 618 and can further store the subsegments in a buffer 620 of the client 604. In the illustrated embodiment, the subsegment downloading module 622 downloaded all subsegments of segments 3.1 and 3.2 and began to download subsegments from segment 3.3.

At or after a start of each downloading operation, a bandwidth monitoring module 624 can determine a bandwidth of the network connection 616. The bandwidth monitoring module 624 can further decide if a lower quality variant should be switched to. For instance, the segments 3.1 and 3.2 were downloaded from the highest quality variant, the third variant 608. Yet, the bandwidth may have dropped during downloading of the segment 3.3. As such, the bandwidth monitoring module 624 may decide that the subsegments already downloaded as part of segment 3.3 should be discarded, and segment 3.3 should be restarted but using the second variant 606 (e.g., segment 2.3).

If such a switch in streaming quality is decided upon, then the already-downloaded subsegments for the current segment (e.g., segment 3.3) are discarded from the buffer 620 of the client, and the bandwidth monitoring module 624 requests restart of download of the current segment from a lower-quality variant. The request can go directly to the server 602, or may be passed to the subsegment downloading module 622 that then passes information to the server 602 initiating download of a lower-quality segment starting with a first subsegment of the lower-quality segment.

In the illustrated embodiment, the decision as to whether to continue with a current variant or switch variants may consider bandwidth and segment size to estimate how long continued download of a stalled segment will take and how long download of an entire segment from a lower variant will take. Such a calculation can use segment size, which may be determined or estimated via an optional segment size calculating module 628.

Figure 7:
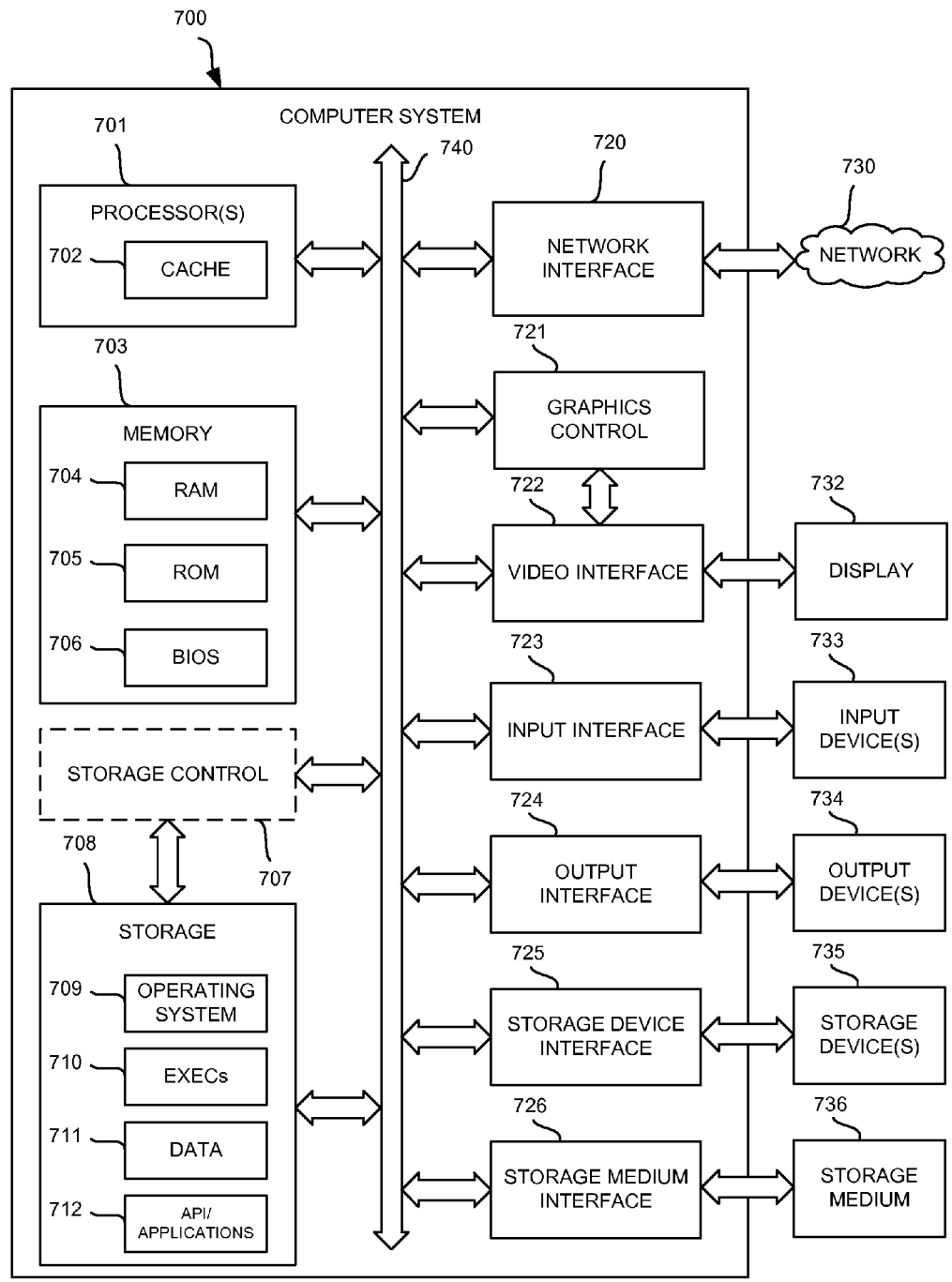
FIG. 7 shows a diagrammatic representation of one embodiment of a machine in the exemplary form of a computer system.

The systems and methods described herein can be implemented in a machine such as a computer system in addition to the specific physical devices described herein. FIG. 7 shows a diagrammatic representation of one embodiment of a machine in the exemplary form of a computer system 700 within which a set of instructions can execute for causing a device to perform or execute any one or more of the aspects and/or methodologies of the present disclosure. The components in FIG. 7 are examples only and do not limit the scope of use or functionality of any hardware, software, embedded logic component, or a combination of two or more such components implementing particular embodiments.

Computer system 700 may include a processor 701, a memory 703, and a storage 708 that communicate with each other, and with other components, via a bus 740. The bus 740 may also link a display 732, one or more input devices 733 (which may, for example, include a keypad, a keyboard, a mouse, a stylus, etc.), one or more output devices 734, one or more storage devices 735, and various tangible storage media 736. All of these elements may interface directly or via one or more interfaces or adaptors to the bus 740. For instance, the various tangible storage media 736 can interface with the bus 740 via storage medium interface 726. Computer system 700 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Processor(s) 701 (or central processing unit(s) (CPU(s))) optionally contains a cache memory unit 702 for temporary local storage of instructions, data, or computer addresses. Processor(s) 701 are configured to assist in execution of computer readable instructions. Computer system 700 may provide functionality as a result of the processor(s) 701 executing software embodied in one or more tangible computer-readable storage media, such as memory 703, storage 708, storage devices 735, and/or storage medium 736. The computer-readable media may store software that implements particular embodiments, and processor(s) 701 may execute the software. For instance, the software may be a modified version of the FetchFile software module, which is a part of HTTP. Memory 703 may read the software from one or more other computer-readable media (such as mass storage device(s) 735, 736) or from one or more other sources through a suitable interface, such as network interface 720. The software may cause processor(s) 701 to carry out one or more processes or one or more steps of one or more processes described or illustrated herein. Carrying out such processes or steps may include defining data structures stored in memory 703 and modifying the data structures as directed by the software.

The memory 703 may include various components (e.g., machine readable media) including, but not limited to, a random access memory component (e.g., RAM 704) (e.g., a static RAM "SRAM", a dynamic RAM "DRAM, etc.), a read-only component (e.g., ROM 705), and any combinations thereof. ROM 705 may act to communicate data and instructions unidirectionally to processor(s) 701, and RAM 704 may act to communicate data and instructions bidirectionally with processor(s) 701. ROM 705 and RAM 704 may include any suitable tangible computer-readable media described below. In one example, a basic input/output system 706 (BIOS), including basic routines that help to transfer information between elements within computer system 700, such as during start-up, may be stored in the memory 703.

Fixed storage 708 is connected bidirectionally to processor(s) 701, optionally through storage control unit 707. Fixed storage 708 provides additional data storage capacity and may also include any suitable tangible computer-readable media described herein. Storage 708 may be used to store operating system 709, EXECs 710 (executables), data 711, API applications 712 (application programs), and the like. Often, although not always, storage 708 is a secondary storage medium (such as a hard disk) that is slower than primary storage (e.g., memory 703). Storage 708 can also include an optical disk drive, a solid-state memory device (e.g., flash-based systems), or a combination of any of the above. Information in storage 708 may, in appropriate cases, be incorporated as virtual memory in memory 703.

In one example, storage device(s) 735 may be removably interfaced with computer system 700 (e.g., via an external port connector (not shown)) via a storage device interface 725. Particularly, storage device(s) 735 and an associated machine-readable medium may provide nonvolatile and/or volatile storage of machine-readable instructions, data structures, program modules, and/or other data for the computer system 700. In one example, software may reside, completely or partially, within a machine-readable medium on storage device(s) 735. In another example, software may reside, completely or partially, within processor(s) 701.

Bus 740 connects a wide variety of subsystems. Herein, reference to a bus may encompass one or more digital signal lines serving a common function, where appropriate. Bus 740 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 700 may also include an input device 733. In one example, a user of computer system 700 may enter commands and/or other information into computer system 700 via input device(s) 733. Examples of an input device(s) 733 include, but are not limited to, an alpha-numeric input device (e.g., a keyboard), a pointing device (e.g., a mouse or touchpad), a touchpad, a joystick, a gamepad, an audio input device (e.g., a microphone, a voice response system, etc.), an optical scanner, a video or still image capture device (e.g., a camera), and any combinations thereof. Input device(s) 733 may be interfaced to bus 740 via any of a variety of input interfaces 723 (e.g., input interface 723) including, but not limited to, serial, parallel, game port, USB, FIREWIRE, THUNDERBOLT, or any combination of the above.

In particular embodiments, when computer system 700 is connected to network 730, computer system 700 may communicate with other devices, specifically mobile devices and enterprise systems, connected to network 730. Communications to and from computer system 700 may be sent through network interface 720. For example, network interface 720 may receive incoming communications (such as requests or responses from other devices) in the form of one or more packets (such as Internet Protocol (IP) packets) from network 730, and computer system 700 may store the incoming communications in memory 703 for processing. Computer system 700 may similarly store outgoing communications (such as requests or responses to other devices) in the form of one or more packets in memory 703 and communicated to network 730 from network interface 720. Processor(s) 701 may access these communication packets stored in memory 703 for processing.

Examples of the network interface 720 include, but are not limited to, a network interface card, a modem, and any combination thereof. Examples of a network 730 or network segment 730 include, but are not limited to, a wide area network (WAN) (e.g., the Internet, an enterprise network), a local area network (LAN) (e.g., a network associated with an office, a building, a campus or other relatively small geographic space), a telephone network, a direct connection between two computing devices, and any combinations thereof. A network, such as network 730, may employ a wired and/or a wireless mode of communication. In general, any network topology may be used.

Information and data can be displayed through a display 732. Examples of a display 732 include, but are not limited to, a liquid crystal display (LCD), an organic liquid crystal display (OLED), a cathode ray tube (CRT), a plasma display, and any combinations thereof. The display 732 can interface to the processor(s) 701, memory 703, and fixed storage 708, as well as other devices, such as input device(s) 733, via the bus 740. The display 732 is linked to the bus 740 via a video interface 722, and transport of data between the display 732 and the bus 740 can be controlled via the graphics control 721.

In addition to a display 732, computer system 700 may include one or more other peripheral output devices 734 including, but not limited to, an audio speaker, a printer, and any combinations thereof. Such peripheral output devices may be connected to the bus 740 via an output interface 724. Examples of an output interface 724 include, but are not limited to, a serial port, a parallel connection, a USB port, a FIREWIRE port, a THUNDERBOLT port, and any combinations thereof.

In addition or as an alternative, computer system 700 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A system comprising:
a network interface configured to download segments of an original media file from a server via multiple download operations, each download of a subsegment of a segment encoded at a first quality;
a client buffer for storing the subsegments;
a bandwidth monitoring module, stored on a memory device, configured to:
perform a READ function of a Fetch File portion of HTTP code to download each subsegment, where a first number of subsegments per segment are read for a first bandwidth and a second number of subsegments per segment are read for a second bandwidth, the second bandwidth being greater than the first bandwidth and the first number being greater than the second number;
at or after a start of each download of a subsegment, determine a bandwidth of a network connection between the network interface and the server; and
determine, based on the bandwidth of the network connection, whether a current one of the segments should be downloaded at a second quality different from the first quality, and if so:
discard downloaded subsegments of the current one of the segments from the client buffer; and
download the current one of the segments encoded at a second quality.

2. The system of claim 1, wherein encoding at the second quality generates a smaller file size than encoding at the first quality.

3. The system of claim 1, wherein the determine operation is performed while the current one of the segments is partially downloaded.

4. The system of claim 1, wherein the bandwidth monitoring module is further configured to determine that a predicted time to discard the downloaded subsegments of the current one of the segments and restart the download and reading of the current one of the segments encoded at the second quality is less than a predicted time to complete a download of the current one of the segments encoded at the first quality.

5. The system of claim 1, wherein the bandwidth monitoring module looks to a header of incoming data packets to determine a bandwidth of the network connection.

6. The system of claim 1, wherein the bandwidth monitoring module includes a segment size calculating module configured to determine or estimate a size of the current one of the segments.

7. The system of claim 6, wherein the segment size calculating module looks to a content-length field of an HTTP-request for the original media file to determine the segment size.

8. The system of claim 1, wherein the determine operation involves determining if download of the segment can be completed in less time if the downloaded subsegments of the current one of the segments are discarded, and the current one of the segments encoded at a second quality is downloaded.

9. A method for streaming an original media file using adaptive bandwidth switching, the method comprising:
performing a READ function of a FetchFile portion of HTTP code to download, via multiple read operations, into a client buffer, subsegments of a segment of the original media file, the segment being one of a plurality of segments in a first variant, the first variant referencing a first quality encoding of the original media file;
determining that a bandwidth of the network has decreased, where the determining occurs at or after a start of each read operation; and subsequently
selecting a number of subsegments to be downloaded for the segment, where the number of subsegments is inversely related to the bandwidth;
predicting, based on the bandwidth, that switching to a second variant referencing a second quality encoding of the original media file will enable a faster download of the segment;
discarding from the client buffer, subsegments of the segment that have already been downloaded;
selecting a second variant, the second variant referencing a second quality encoding of the original media file, the second quality being less than the first quality; and
downloading, via multiple read operations, into the client buffer, subsegments of the segment of the original media file, the segment being one of a plurality of segments in a second variant.

10. The method of claim 9, wherein the determining the bandwidth includes estimating the bandwidth.

11. The method of claim 10, wherein the estimating the bandwidth includes taking a weighted average of previous bandwidths and a current bandwidth to determine the bandwidth.

12. The method of claim 9, wherein the determining includes deciding that discarding all downloaded subsegments of the segment and fetching the segment starting with a first subsegment of the segment via a different variant is better for the user experience than continuing to download the segment via the current bandwidth.

13. The method of claim 12, wherein the determining includes estimating a time remaining to complete downloading the segment.

14. A non-transitory, tangible computer readable storage medium, encoded with processor readable instructions to perform a method for adaptive bandwidth switching, the method comprising:
performing a READ function of a FetchFile portion of HTTP code to download, via multiple read operations, into a client buffer, subsegments of a segment of the original media file, the segment being one of a plurality of segments in a first variant, the first variant referencing a first quality encoding of the original media file;
determining that a bandwidth of the network has decreased, where the determining occurs at or after a start of each read operation, where the determining is based on samples of the bandwidth taken at or after download of each subsegment;
adjusting a number of subsegments per segment that are downloaded as an inverse function of the bandwidth; and subsequently
predicting, based on the bandwidth, that switching to a second variant referencing a second quality encoding of the original media file will enable a faster download of the segment;
discarding from the client buffer, subsegments of the segment that have already been downloaded;
selecting a second variant, the second variant referencing a second quality encoding of the original media file, the second quality being less than the first quality; and
downloading, via multiple read operations, into the client buffer, subsegments of the segment of the original media file, the segment being one of a plurality of segments in a second variant.

15. A method comprising:
downloading from a server, via a network interface, segments of an original media file from a server via multiple download operations, each download of a subsegment of a segment encoded at a first quality;
storing the subsegments in a client buffer;
performing a READ function of a FetchFile portion of HTTP code to download each subsegment, where a first number of subsegments per segment are read for a first bandwidth and a second number of subsegments per segment are read for a second bandwidth, the second bandwidth being greater than the first bandwidth and the first number being greater than the second number;
at or after a start of each download of a subsegment, determining a bandwidth of a network connection between the network interface and the server; and
determining, based on the bandwidth of the network connection, whether a current one of the segments should be downloaded at a second quality different from the first quality, and if so:
discarding downloaded subsegments of the current one of the segments from the client buffer; and
downloading the current one of the segments encoded at a second quality.

16. The method of claim 15, wherein encoding at the second quality generates a smaller file size than encoding at the first quality.

17. The method of claim 15, wherein the determining operation is performed while the current one of the segments is partially downloaded.

18. The method of claim 15, further comprising: determining that a predicted time to discard the downloaded subsegments of the current one of the segments and restart the download and reading of the current one of the segments encoded at the second quality is less than a predicted time to complete a download of the current one of the segments encoded at the first quality.

19. The method of claim 15, further comprising: looking to a header of incoming data packets to determine a bandwidth of the network connection.

20. The method of claim 15, further comprising: estimating a size of the current one of the segments.

* * * * *